(12) United States Patent
Zhang

(10) Patent No.: US 8,639,985 B2
(45) Date of Patent: Jan. 28, 2014

(54) USB TESTING APPARATUS AND METHOD

(75) Inventor: Yu-Gang Zhang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 265 days.

(21) Appl. No.: 13/326,258

(22) Filed: Dec. 14, 2011

(65) Prior Publication Data

US 2013/0139005 A1   May 30, 2013

(30) Foreign Application Priority Data

Nov. 29, 2011   (CN) .......................... 2011 1 0387175

(51) Int. Cl.
*G06F 11/00*   (2006.01)

(52) U.S. Cl.
USPC ......................................................... 714/43

(58) Field of Classification Search
USPC ......................................................... 714/43
See application file for complete search history.

(56) References Cited

U.S. PATENT DOCUMENTS

2013/0166953 A1* 6/2013 Tanaka ............................ 714/25
2013/0238785 A1* 9/2013 Hawk et al. .................... 709/224

* cited by examiner

*Primary Examiner* — Bryce Bonzo
(74) *Attorney, Agent, or Firm* — Altis Law Group, Inc.

(57) ABSTRACT

A Universal Serial Bus (USB) testing apparatus includes a Central Processing Unit (CPU); a Southbridge; a Baseboard Management Controller (BMC), connected with the Southbridge via USB. The BMC determines if a test starts or finishes, generates a first instruction of creating a virtual control computer when determining the test starts, creates a control module and a comparing module in a memory unit which are running to become the virtual control computer, and connects the memory unit with the BMC according to the first instruction. The control module sends control data to the CPU. The comparing module obtains feedback data from the CPU and compares the control data with the obtained data to determine if the control data is consistent with the obtained data, thereby determining whether the USB is working normally.

8 Claims, 3 Drawing Sheets

USB TESTING APPARATUS AND METHOD

BACKGROUND

1. Technical Field

The present disclosure relates to a USB (Universal Serial Bus) testing apparatus and method, and more particularly to a USB testing apparatus and a method using only one of such testing apparatus in USB testing.

2. Description of Related Art

FIG. 1 is a block diagram of a traditional USB testing system using two apparatus. The USB testing system includes two apparatus, i.e., a computer 10 and a control computer 20 for remotely controlling the computer 10. The computer 10 includes a CPU (Central Processing Unit) 101, a Southbridge 102, and a BMC (Baseboard Management Controller) 103. The CPU 101 is configured to process data and perform control functions. The BMC 103 is a specialized service processor that monitors the working states of the computer 10, the control computer 20 or other hardware device. The BMC 103 is connected with the Southbridge 102 via the USB 100. The control computer 20 sends data to the computer 10 via a network to control the computer 10 to perform one or more functions, and obtains data from the computer 10, and compares the control data with the obtained data from the computer 10 to determine if the USB 100 is working normally.

However, as the USB testing system uses two apparatus, it is a waste of resources.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Embodiments of the present disclosure will now be described in detail below, with reference to the accompanying drawings.

Figure 1:
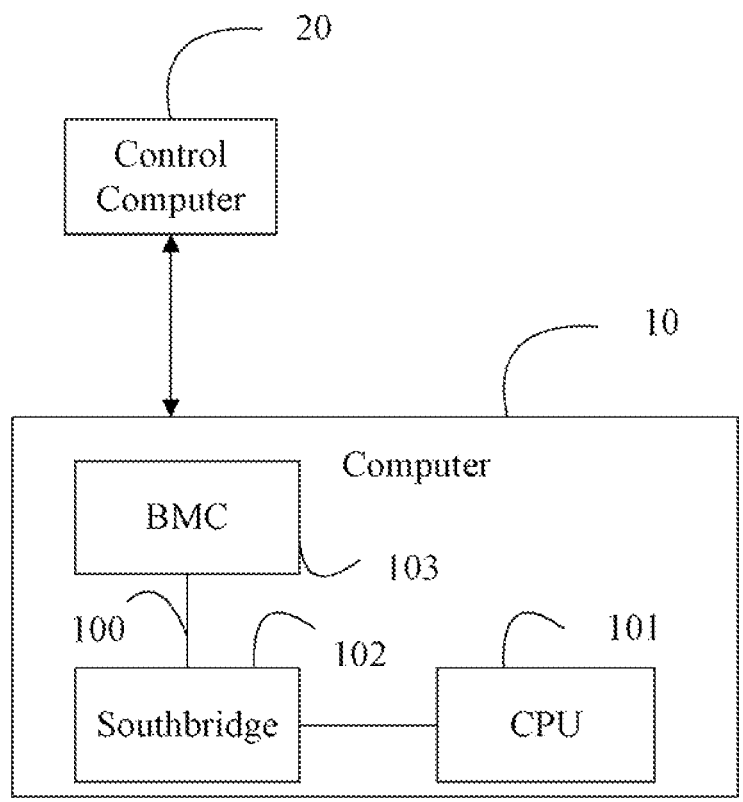
FIG. 1 is a block diagram of a traditional USB testing system using two apparatus.
Figure 2:
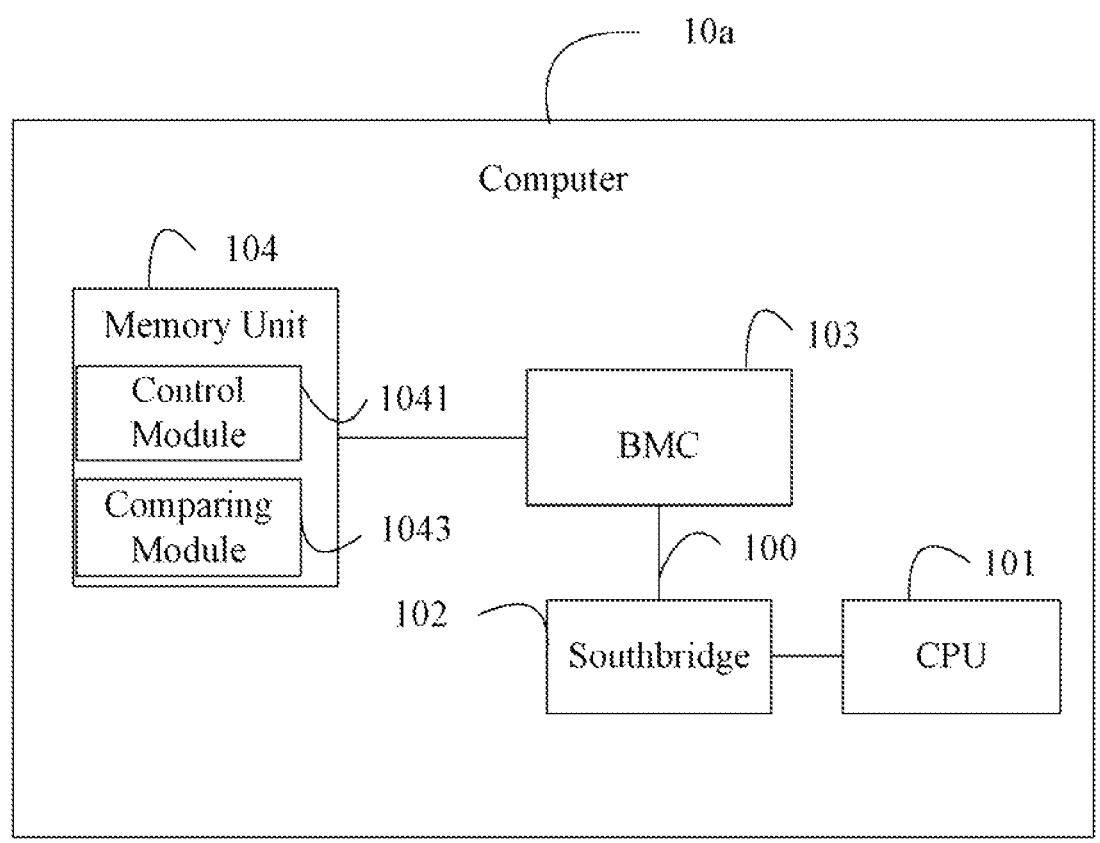
FIG. 2 is a block diagram of an embodiment of a USB testing system using only one apparatus, in accordance with the present disclosure.

Referring to FIG. 2, as a development from the situation in FIG. 1, a USB testing system 10a is shown by an embodiment, here the testing system is a computer 10a, the BMC 103 is further configured to determine whether the test is starting or has finished, to generate a first instruction of creating a virtual control computer when determining that the test is starting. The BMC 103 creates a control module 1041 and a comparing module 1043 in a memory unit 104 and connects the memory unit 104 with the BMC 103 according to the first instruction. The control module 1041 and the comparing module 1043 are running to become the virtual control computer. The control module 1041 and the comparing module 1043 are software components and drivers for controlling general tasks and facilitating communication between hardware and software components in the computer 10a.

Typically, the control module 1041 includes control data to be sent to the CPU 101 to control the computer 10a to perform corresponding functions. When the USB 100 is working normally, the CPU 101 processes and performs functions corresponding to the control data. In the situation, feedback data corresponding to the performed functions in the CPU 101 are consistent with the control data. The comparing module 105 is configured to obtain feedback data from the CPU 101 and compare the control data with the obtained data from the CPU 101 to determine whether the USB 100 is working normally. The BMC 103 is further configured to generate a second instruction of releasing the virtual control computer. The BMC 103 frees the space of the control module 1041 and the comparing module 1043 in the memory unit 104 according to the second instruction.

The present disclosure only uses the computer 10a to test the USB 100, thereby saving resources.

Figure 3:
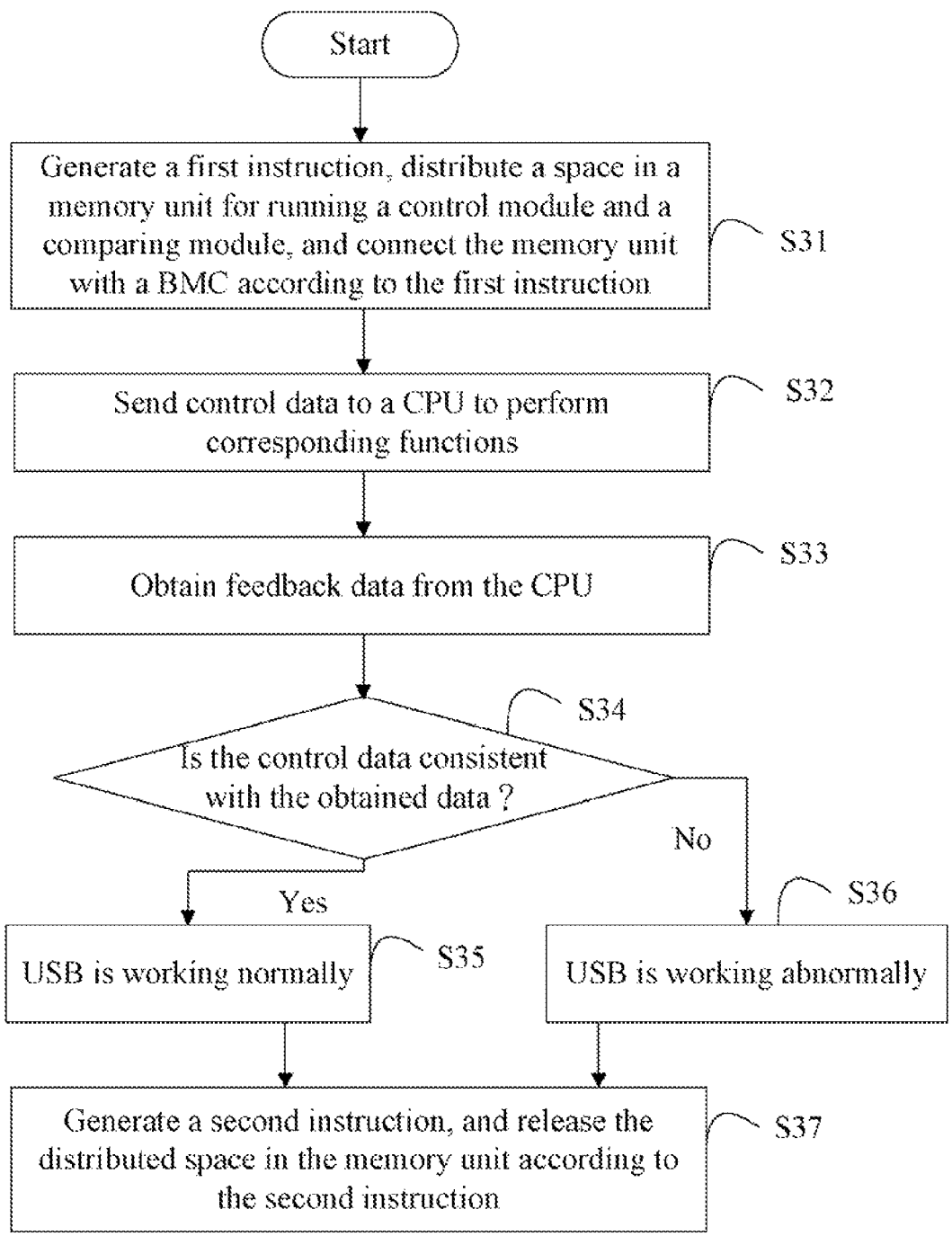
FIG. 3 is a flowchart of an embodiment of a USB testing method using only one apparatus, in accordance with the present disclosure.

FIG. 3 is a flowchart of a USB testing method by only using the computer 10a. In step S31, the BMC 103 generates the first instruction when determining the start of the test, and creates the control module 1041 and the comparing module 1043 in the memory unit 104 for running to become the virtual control computer and connecting the memory unit 104 with the BMC 103 after generating the first instruction.

In step S32, the control module 1041 sends the control data to the CPU 101 to control the computer 10a to perform corresponding functions.

In step S33, the comparing module 1043 obtains feedback data from the CPU 101.

In step S34, the comparing module 1043 compares the control data with the obtained data from the CPU 101 to determine if the control data is consistent with the obtained data.

In step S35, the comparing module 1043 indicates that the USB 100 is working normally if the control data is consistent with the obtained data.

In step S36, the comparing module 1043 indicates that the USB 100 is working abnormally if the control data is not consistent with the obtained data.

In step S37, the BMC 103 generates the second instruction, and free the space of the control module 1041 and the comparing module 1043 in the memory unit 104 after generating the second instruction.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A Universal Serial Bus (USB) testing apparatus comprising:
   a Central Processing Unit (CPU);
   a Southbridge;
   a Baseboard Management Controller (BMC), connected with the Southbridge via USB, and configured to monitor working states of the USB testing apparatus;
   wherein the BMC is further configured to determine if a test starts or finishes, generate a first instruction of creating a virtual control computer when determining the test starts, create a control module and a comparing module in a memory unit which are running to become the virtual control computer, and connect the memory unit with the BMC according to the first instruction; and wherein the control module is configured to send control data to the CPU, and the comparing module is configured to obtain feedback data from the CPU and compare the control data with the obtained data to determine if the control data is consistent with the obtained data, thereby determining whether the USB is working normally.

2. The USB testing apparatus of claim 1, wherein the BMC is further configured to generate a second instruction of releasing the virtual control computer, and to free a space of the control module and the comparing module in the memory unit according to the second instruction.

3. The USB testing apparatus of claim 1, wherein the comparing module is further configured to indicate that the USB is working normally when the control data is consistent with the obtained data.

4. The USB testing apparatus of claim 1, wherein the comparing module is further configured to indicate that the USB is working abnormally if the control data is not consistent with the obtained data.

5. A Universal Serial Bus (USB) testing method, the method comprising:

providing a USB testing apparatus comprising a Central Processing Unit (CPU), a Southbridge, and a Baseboard Management Controller (BMC) connected with the Southbridge via USB;

controlling the BMC to determine if a test starts or finishes;

controlling the BMC to generate a first instruction of creating a virtual control computer when determining the test starts, create a control module and a comparing module in a memory unit which are running to become the virtual control computer, and connect the memory unit with the BMC according to the first instruction;

controlling the memory unit to send the control data to the CPU, obtain feedback data from the CPU and compare the control data with the obtained data to determine if the control data is consistent with the obtained data, thereby determining whether the USB is working normally.

6. The USB testing method of claim 1, wherein the method further comprising controlling the BMC to generate a second instruction of releasing the virtual control computer, and free a space of the control module and the comparing module in the memory unit according to the second instruction.

7. The USB testing method of claim 1, wherein the method further comprising controlling the BMC to indicate the USB is working normally if the control data is consistent with the obtained data.

8. The USB testing method of claim 1, wherein the method further comprising controlling the BMC to indicate the USB is working abnormally if the control data is not consistent with the obtained data.

* * * * *